United States Patent
Cecil et al.

(10) Patent No.: US 6,729,529 B2
(45) Date of Patent: May 4, 2004

(54) SYSTEM AND METHOD FOR CUTTING AND ORBITAL WELDING THIN-WALLED TUBING

(75) Inventors: Paul J. Cecil, Milton, WA (US); Roger G. Rae, Sumner, WA (US); Elton R. Rice, Pacific, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 10/083,896

(22) Filed: Feb. 27, 2002

(65) Prior Publication Data

US 2003/0160086 A1 Aug. 28, 2003

(51) Int. Cl.$^7$ .................. B23K 37/053; B21C 37/08
(52) U.S. Cl. .............. 228/44.5; 228/212; 228/171; 228/173.4; 228/5.1; 228/49.3; 219/60 A; 269/41; 269/95
(58) Field of Search ................ 228/170, 171, 228/164, 173.4, 212, 44.5, 5.1, 49.3, 13; 219/60 A; 269/37–45, 88–89, 91, 95, 97–102, 126–129

(56) References Cited

U.S. PATENT DOCUMENTS

| | | | |
|---|---|---|---|
| 2,108,077 A | * | 2/1938 | Robinson ............... 269/43 |
| 3,668,359 A | | 6/1972 | Emmerson |
| 3,933,292 A | * | 1/1976 | Martin ................. 228/49.3 |
| 4,190,186 A | * | 2/1980 | Flowers et al. ......... 228/15.1 |
| 4,290,291 A | * | 9/1981 | Burns ................... 72/316 |
| 4,605,151 A | | 8/1986 | Brown |
| 4,750,662 A | * | 6/1988 | Kagimoto .............. 228/44.5 |
| 4,868,367 A | * | 9/1989 | Benway et al. .......... 219/161 |
| 5,196,664 A | | 3/1993 | McGushion |
| 5,288,963 A | * | 2/1994 | Jusionis ............... 219/60 A |
| 5,383,503 A | * | 1/1995 | Johnson ............. 144/144.51 |
| 5,655,699 A | | 8/1997 | McGushion |
| 5,732,455 A | * | 3/1998 | Diede ................... 29/281.5 |

FOREIGN PATENT DOCUMENTS

JP        59232698 A    * 12/1984

* cited by examiner

Primary Examiner—Kiley Stoner
(74) Attorney, Agent, or Firm—Harness Dickey & Pierce P.L.C.

(57) ABSTRACT

A system for providing cutting and orbitally welding thin-walled tubing. The system includes a plurality of clamping blocks that hold the tubing while the tubing is trimmed and orbitally welded. The system further includes at least one tooling plate to which the clamping blocks can be mounted such that the tubing is attached to the tooling plate and properly aligned for net length trimming. The system further includes a welding cassette for retaining the clamping blocks and properly aligning the tubing during orbital welding.

21 Claims, 8 Drawing Sheets

SYSTEM AND METHOD FOR CUTTING AND ORBITAL WELDING THIN-WALLED TUBING

FIELD OF INVENTION

The invention relates generally to orbital welding and more particularly to a method and apparatus for precisely cutting, fitting together, and orbitally welding thin-walled tubes, such as titanium.

BACKGROUND OF THE INVENTION

Typically, welding thin-walled tubing, such as titanium, is a manual process requiring a high level of skill to accurately trim, fit, and weld the tubes. State-of-the-art autogenous orbital welding has been used to weld thicker walled pipe, but does not allow welding of thin-walled tubing due to the requirement of a tight fit-up of the mating pieces of tubing to be welded. Root gap tolerances of approximately 0.002 inch are typically required for an autogenous weld. These tolerances typically can not be achieved without hand trimming and fitting the tubing. Additionally, known collets used for welding thicker wall pipe are not suitable for welding thin-walled tubing. Known collets can not be placed on the tubing such that the tubing is held perpendicular to the axis of tungsten travel and such that the weld joint is centered under the tungsten.

Known welding of thin-walled tubing currently involves securing the tubing in a tool using bungee cords and scribing marks on the tubing using headers on the tool as a reference. Next the tubing is removed from the tool, cut on a nibbler and taken to a disk grinder where a mechanic grinds any excess tubing to the scribe line and deburs the tubing. The grinding is a very subjective process that relies on the eye-hand coordination of the mechanic. Next the part is then placed back in the tool where it is fit to an adjoining part which has undergone the same process. If the part needs further trimming, it is removed from the tool again and ground to fit, deburred again and placed back in the tool. Once the part is properly fitted, a tacking band is place on it and it is taken to a tacking table where tacking welds are placed around the weld joint through holes in the tacking band. The tacking band is then removed and the part is placed on a rack to be manually welded. Manual welding is a highly skilled process resulting in variations in the time spent welding and the quality of the weld.

Thus, it is desirable to have system and method of welding thin-walled tubing that overcomes the time and quality problems associated with known manual systems and methods. More specifically, it is desirable to have an automated system and method for orbitally welding thin-walled tubing. Therefore, the desirable system and method would accurately trim tubing such that mating parts have a gap suitable for autogenous orbital welding, accurately hold the mating tubing perpendicular to the orbital welding head, and accurately center the welding joint under the orbital welding head.

BRIEF SUMMARY OF THE INVENTION

In one preferred embodiment a system is provided for cutting and orbitally welding thin-walled tubing. The system includes a plurality of clamping blocks that hold the tubing while the tubing is trimmed and orbitally welded. The system further includes at least one tooling plate to which the clamping blocks can be mounted such that the tubing is attached to the tooling plate and properly aligned for net length trimming. The system further includes a welding cassette for retaining the clamping blocks and properly aligning the tubing during orbital welding.

In another preferred embodiment a method is provided for cutting and orbitally welding thin-walled tubing using a system that includes a plurality of clamping blocks, at least one tooling plate and a welding cassette. The method involves clamping the tubing in the clamping blocks, cutting the tubing to a desired length while the tubing remains clamped in the clamping blocks, and orbitally welding mating pieces of the tubing while the tubing remains clamped in the clamping blocks.

In yet another preferred embodiment a system is provided for cutting and orbitally welding thin-walled tubing. The system includes at least one tooling plate having a plurality of bullet nose pins and connector receptors which properly align the tubing for net length trimming. Additionally the system includes a plurality of clamping blocks having a bottom half and a top half. The bottom half includes a plurality of bullet nose receivers that mate with the bullet nose pins to properly position the bottom half on the tooling plate. The bottom half is coupled to the mounting plate using a plurality of connectors interlocked with the connector receptors. The top half is coupled to the bottom half after a piece of tubing is cradled in the bottom half, thereby clamping the tubing between the bottom half and the top half and properly aligning the tubing for net length trimming. The clamping blocks are removable from the tooling plate while remaining clamped on the respective piece of tubing. Thus, the clamping blocks continue to hold the respective piece of tubing while the tubing is net length trimmed and orbitally welded.

Further, the system includes an automated cutting machine that utilizes the clamping blocks to hold the tubing in a desired position during cutting. Additionally, the cutting machine cuts the tubing such that deburring is not needed. Further yet, the system includes a welding cassette which has a first half that receives an orbital welding head and a pair of the clamping blocks which remain clamped around the respective pieces of tubing. The welding cassette further includes a second half hingedly connected to the first half such that the second half can be placed in an open position which allows the first half to receive the pair of clamping blocks, and further placed in a closed position which encloses the welding head and retains the pair of clamping blocks in a fixed position within the welding cassette. The welding cassette retains the pair of clamping blocks and respective tubing in the proper position and alignment for orbital welding.

BRIEF DESCRIPTION OF THE DRAWINGS

The present invention will become more fully understood from the detailed description and accompanying drawings, wherein.

DETAILED DESCRIPTION OF THE INVENTION

Figure 1:
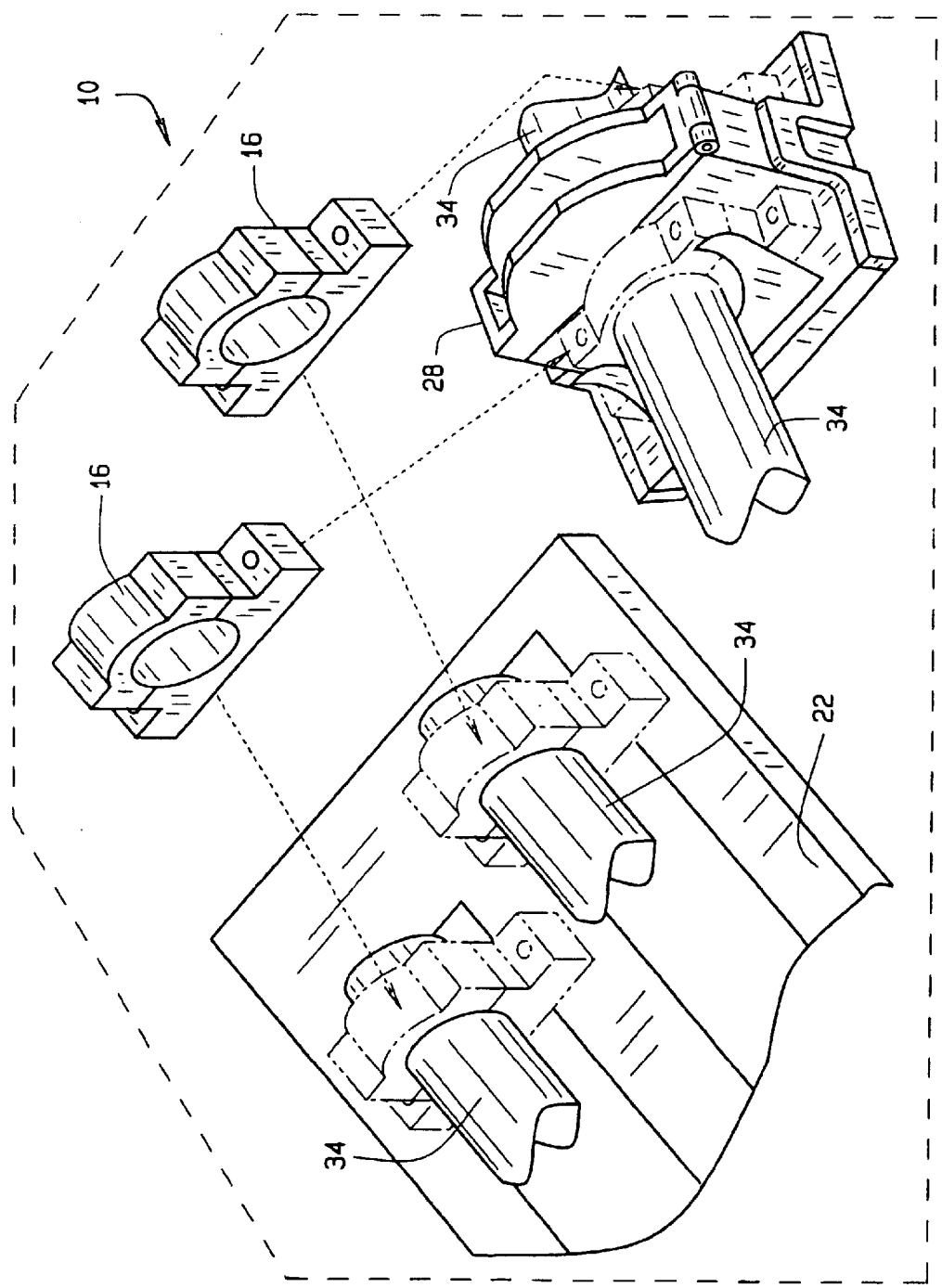
FIG. 1 is a schematic of a system for cutting and welding thin-walled tubing in accordance with a preferred embodiment of the present invention.

FIG. 1 is a schematic of a system 10 for cutting and welding thin-walled tubing in accordance with a preferred embodiment of the present invention. In the preferred embodiment, system 10 includes a plurality of clamping blocks 16, at least one tooling plate 22 and a welding cassette 28. Each clamping block 16 is used to hold a respective piece of thin-walled tubing 34 by clamping a clamping block 16 around each piece of tubing 34. Clamping blocks 16 remain clamped around the respective pieces of tubing 34 while the tubing is trimmed or cut and orbitally welded to another piece of tubing which has also been continuously held by a clamping block 16 while being trimmed and welded. Tooling plate 22, clamping blocks 16, and welding cassette 28 are each described in detail below. In an alternate embodiment, system 10 includes a cutting machine shown and described in reference to FIG. 4 below.

Figure 2:
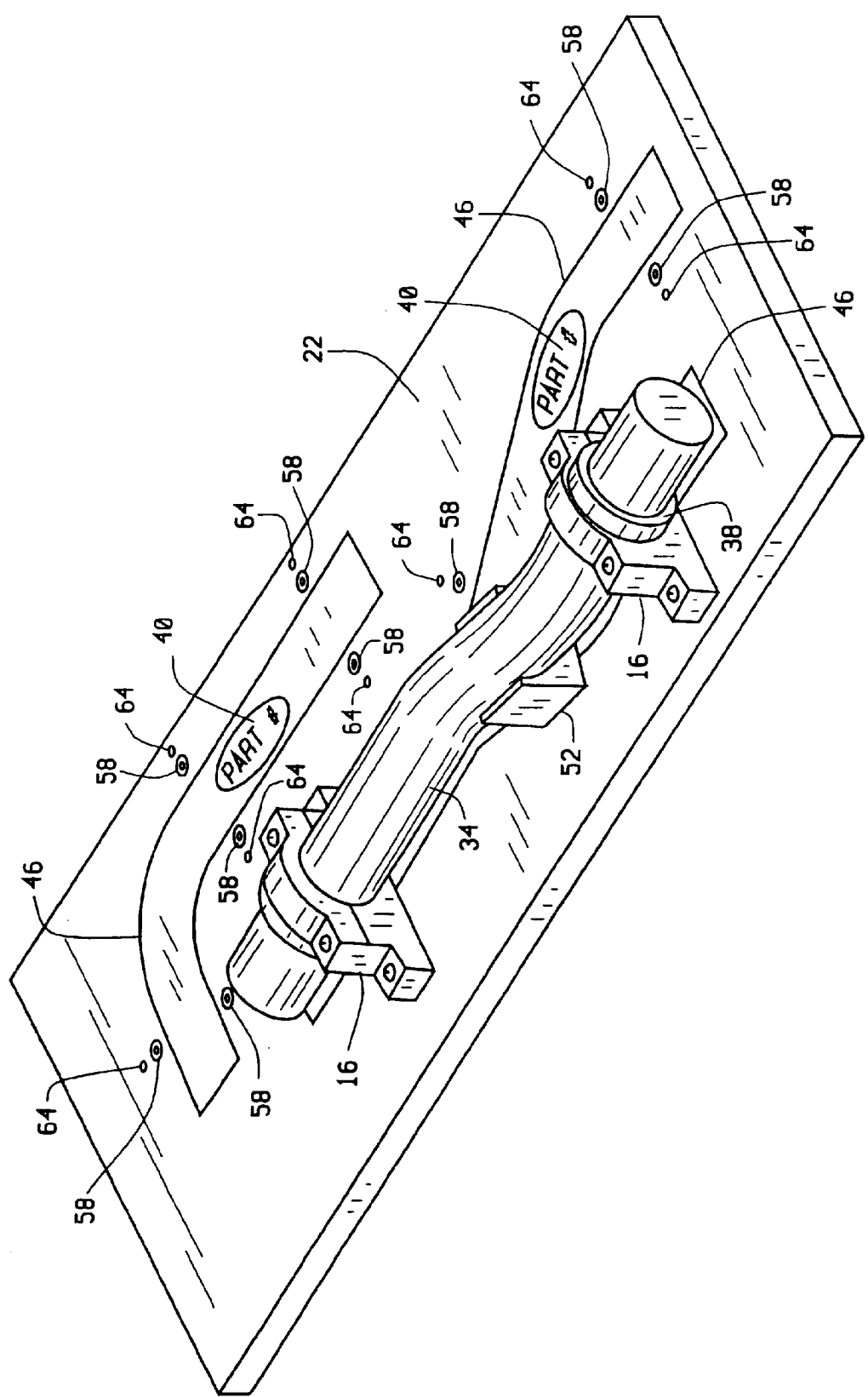
FIG. 2 is an isometric view of a tooling plate used in the system shown in FIG. 1.

FIG. 2 is an isometric view of tooling plate 22 used in system 10 (shown in FIG. 1). Tooling plate 22 is used to locate clamping blocks 16 on thin-walled tubing 34 for net length trim. Net length trim means that tubing 34 is trimmed or cut such that the length of tubing 34 extending beyond a distal face 38 of each clamping block 16 is effectively equal to one half the width of welding cassette 28, for example 0.750 inches. Tooling plate 22 includes at least one tubing identification number 40, also generically referred to as a part number, which identifies a specific piece of tubing 34. The various pieces of tubing 34 can have a variety of configurations that may include one or more bends in a single piece of tubing 34. Therefore, system 10 may include a plurality of tooling plates 22, each specifically designed for specific pieces of tubing 34 having a specific configuration which is identified on the tooling plate 22.

Tooling plate 22 also includes at least one tubing outline 46 coinciding with each tubing identification number 40. Each tubing outline 46 is used to properly orient for trimming the specific piece of tubing 34 identified by tubing identification number 40 when the piece of tubing 34 is mounted on tooling plate 22. Each piece of tubing is mounted on tooling plate 22 using clamping blocks 16. Clamping blocks 16 clamp around each piece of tubing 34 and are connected to tooling plate 22 using connectors (not shown) such as bolts. In addition, pieces of tubing 34 having a bend require at least one saddle 52 placed under the tubing 34 and pivotally mounted to tooling plate 22. Pieces of tubing 34 having a bend must be supported in a minimum of three places to properly clock, or rotationally orient, the tubing 34 in clamping block 16. Straight pieces of tubing 34 clamped to tooling plate 22 may not require the use of saddles 52. Saddles 52 also control lateral shift of tubing 34 as tubing 34 is being placed in clamping blocks 16, thereby assuring that a bend in tubing 34 is properly positioned between clamping blocks 16. Saddles 52 are removably and pivotally mounted to tooling plate 22 using any suitable connecting means, such as pivot pins or bolts, and do not need to be removed from tooling plate 22 when tooling plate 22 is not in use. Saddles 52 are pivotally mounted to allow saddles 52 to take up angle tolerance of bends in tubing 34.

Additionally, tooling plate 22 includes a plurality of bullet nose pins 58 and a plurality of connector receivers 64. Clamping blocks 16 are positioned on tooling plate 22 using the bullet nose pins 58 and then mounted to tooling plate 22 using connector receptors 64. Connector receptors 64 couple, mate, or interlock with connectors (not shown) thereby mounting clamping blocks 16 to tooling plate 22. In one preferred embodiment, connector receptors 64 are threaded holes and the connectors are bolts that extend through holes in clamping blocks 16 and are threaded into connector receptors 64. However, the connectors can be any suitable connector that will securely couple, or mount, clamping blocks 16 to tooling plate 22. For example the connectors could be snaps and connector receptors 64 could be snap receptors, or the connectors could be buckles or any type of clamps and the connector receptors could be the mating components of the buckles or clamps.

Figure 3:
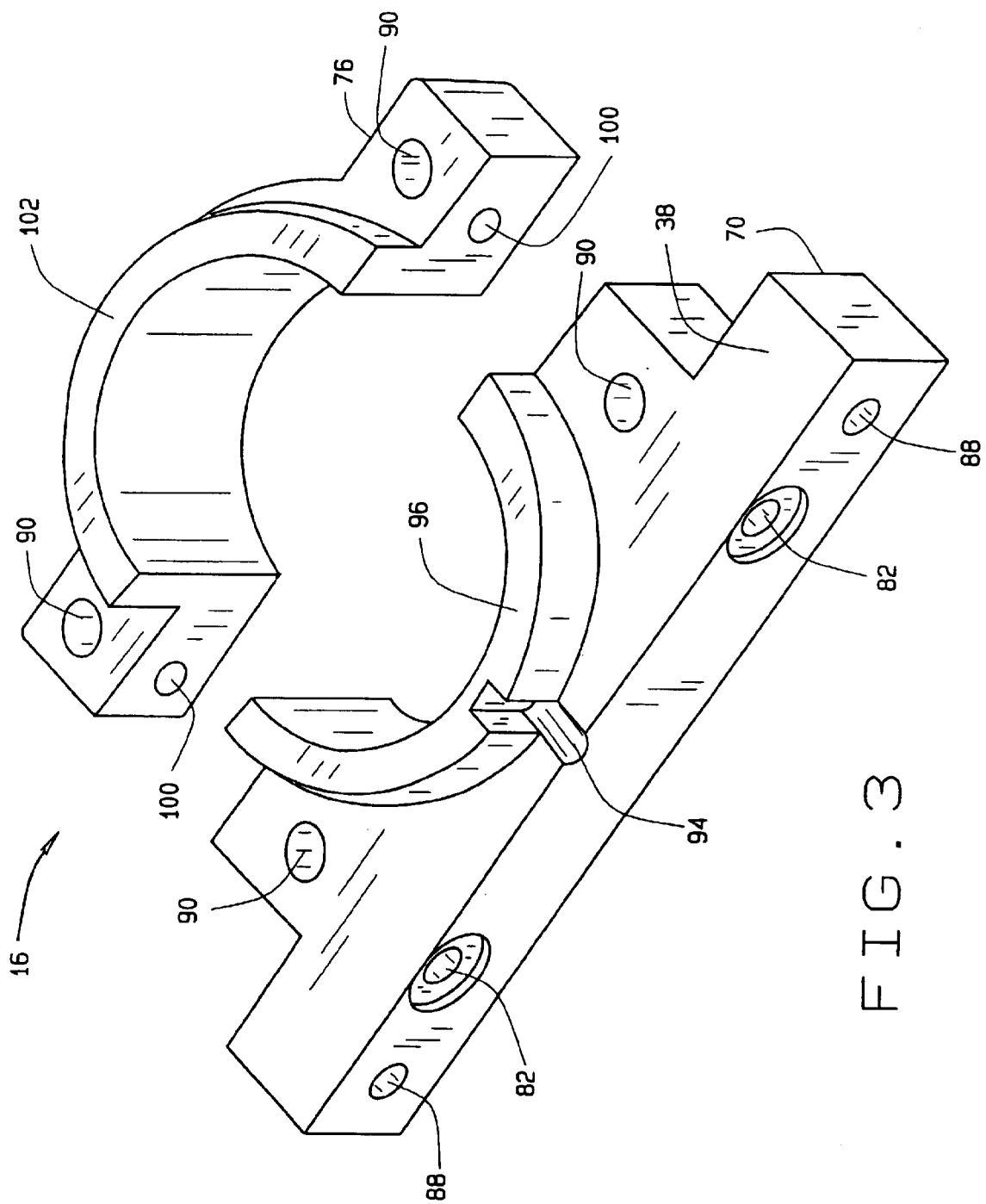
FIG. 3 is an isometric view of a clamping block used in the system shown in FIG. 1.

FIG. 3 is an isometric view of one of the plurality of clamping blocks 16 used in system 10 (shown in FIG. 1). Clamping block 16 includes a bottom half 70 and a top half 76. Bottom half 70 includes a plurality of bullet nose receivers 82, through holes 88, index holes 90, and a clocking slot 94 located on a circumferential lip 96 of bottom half 70. Clocking slot 94 is used to rotationally orient the piece of tubing 34 held by the respective clamping block 16 during orbital welding. Clocking slot 94 may be located anywhere along lip 96 depending on the desired rotational orientation of tubing 34. Therefore, clocking slot 94 is part specific such that a specific clamping block 16 must be used with the correct tooling plate 22 and tubing 34. Top half 76 includes through holes 100 and a circumferential lip 102. Although not shown in FIG. 3, clocking slot 94 could also be located anywhere along circumferential lip 102.

Bullet nose receivers 82 mate with bullet nose pins 58 (shown in FIG. 2) to properly position bottom half 70 on tooling plate 22 (shown in FIG. 2). Once clamping bracket bottom half 70 is properly positioned on tooling plate 22, bottom half 70 is mounted, or coupled, to tooling plate 22 using the connectors and connector receptors 64 (shown in FIG. 2). In the preferred embodiment, the connectors are bolts and connector receptors 64 are threaded holes such that the bolts extend through through holes 88 and are threaded into connector receptors 64. After the proper number of bottom halves 70 are mounted on tooling plate 22, as identified by tubing outline 46, the related piece of tubing 34, as identified by tubing identification number 40, is cradled in bottom halves 16. Also, if identified by tubing outline 46, one or more saddles 52 (shown in FIG. 2) may be coupled to tooling plate 22 and the related piece of tubing 34 would be cradled in clamping bracket bottom halves 70 and saddles 52. It is envisioned that typically each piece of tubing may be cradled in two clamping block bottom halves 70, one at each end of tubing 34, and any number of saddles 52 necessary to properly support tubing 34.

After the piece of tubing 34 is cradled in bottoms halves 70 and any saddles 52, clamping block top halves 76 are placed over tubing 34 and coupled to bottom halves 70 thereby clamping tubing 34 between bottom halves 70 and top halves 76. Top halves 76 are coupled to bottom halves 70 using any suitable means that will securely couple top halves 76 to bottom halves 70. In one preferred embodiment, bolts (not shown) are inserted through through holes 100 and threaded into threaded holes (not shown) in bottom halves 70. However, each top half 76 can be coupled to the respective bottom half 70 using any other suitable connecting means such as snaps, buckles, or clamps. Tubing outlines 46 are used to determine that the correct configuration of tubing 34, with sufficient length, is used.

Clamping block bottom halves 70 are then decoupled from tooling plate 22 while the respective piece of tubing 34 remains clamped between top halves 76 and bottom halves 70. The piece of tubing 34, with clamping blocks 16 remaining clamped in place, is then taken to a cutting machine, such as the cutting machine described below in reference to FIG. 4, to be cut to length. A clamping block 16 at one end of the tubing 34 is coupled to the cutting machine, thereby securely holding tubing 34 in a desired position to be cut. The cutting machine precisely cuts tubing 34 such that no deburring is needed after the tubing 34 is cut. Once one end of tubing 34 is cut, clamping block 16 is decoupled from the cutting machine and, if desired, the clamping block at the other end of tubing 34 is coupled to the cutting machine and the respective end of tubing 34 is also precisely cut such that no deburring is needed. Once tubing 34 is precisely cut by the cutting machine, the piece of tubing is ready to be welded to another piece of tubing that has likewise been trimmed utilizing tooling plate 22 and clamping blocks 16.

Figure 4:
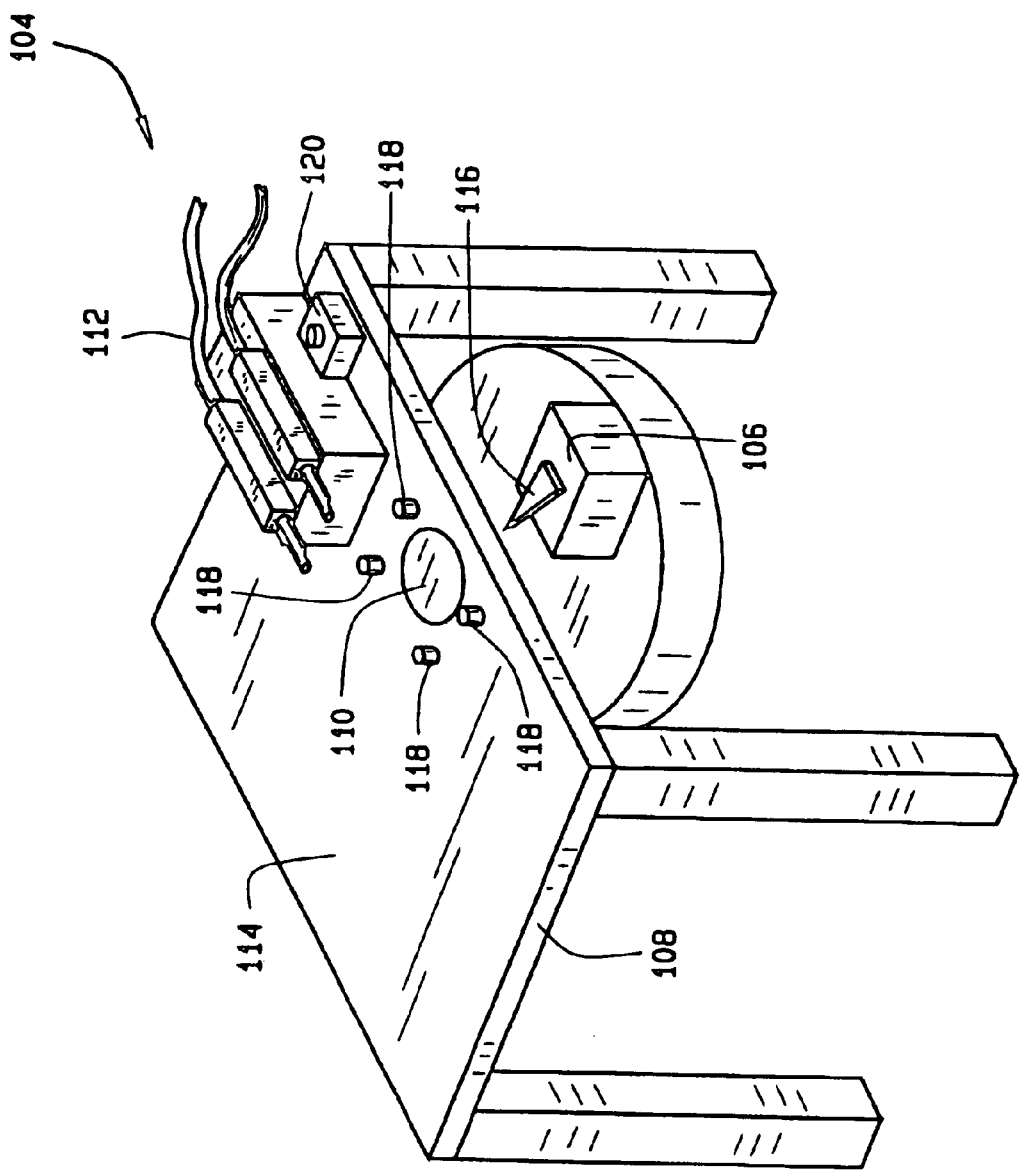
FIG. 4 is an isometric view of an automated cutting machine included in an alternate embodiment of the system shown in FIG. 1.

FIG. 4 is an isometric view of an automated cutting machine 104 included in an alternate embodiment of system 10 (shown in FIG. 1). Cutting machine 104 includes a parting tool 106, an index plate 108, a hole 110 in index plate 108, and pneumatic clamps 112. Cutting machine 104 uses parting tool 106 to automatically cut tubing 34 to a predetermined length with a high level of precision and such that tubing 34 needs no deburring after tubing 34 is cut. Tubing 34 is stably mounted to index plate 108 while parting tool 106 automatically rotates around the outside of tubing 34, thereby cutting or trimming tubing 34.

A top surface 114 of index plate 108 is located a distance above a parting tool top surface 116 effectively equal to half the width of welding cassette 28, for example 0.750 inches. Clamping block 16 mates to top surface 114 for trimming of tubing 34. The tolerance in the distance between index plate top surface 114 and parting tool top surface 116 is small to assure that tubing 34 is precisely cut to length and that the cut will meet a maximum root gap requirement of 0.002 inches, required for autogenous welding. Pneumatic clamps 112 are mounted to the top of the index plate 108 and hold clamping block 16 such that tubing 34 is in proper alignment during trimming. Index plate 108 includes index pins 118 that mate with clamping block index holes 90 (shown in FIG. 3) to properly align clamping block 16 on index plate 108, and assure the tubing 34 is centered in the path of parting tool 106.

When a start button 120 is depressed to activate cutting machine 104, parting tool 106 begins to rotate around tubing 34 cutting and advancing into tubing 34 in small increments with every rotation of parting tool 106, for example 0.002 inches. When tubing 34 is severed, the excess material drops off into a scrap bin (not shown), and parting tool 106 retracts and returns to a home position.

Thus, to cut or trim tubing 34 to the net length using cutting machine 104, tubing 34 is inserted through hole 110 in index plate 108 and clamping block 16 is properly positioned on index plate 108 by mating index pins 118 with clamping block index holes 90. Pneumatic clamps 112 are then engaged to steadily hold clamping blocks 16 and tubing 34 in place so that tubing 34 will be precisely trimmed. Start button 120 is pressed and parting tool 106 rotates around the tubing 34 extending below index plate 108, thereby trimming tubing 34 a distance below clamping block distal face 38 effectively equal to half the width of welding cassette 28, for example 0.750 inches. After the cycle is complete and tubing 34 is trimmed, pneumatic clamps 112 are released, and if desired, tubing 34 is longitudinally rotated so that the process can be repeated on the opposing uncut end of tubing 34.

Figure 5:
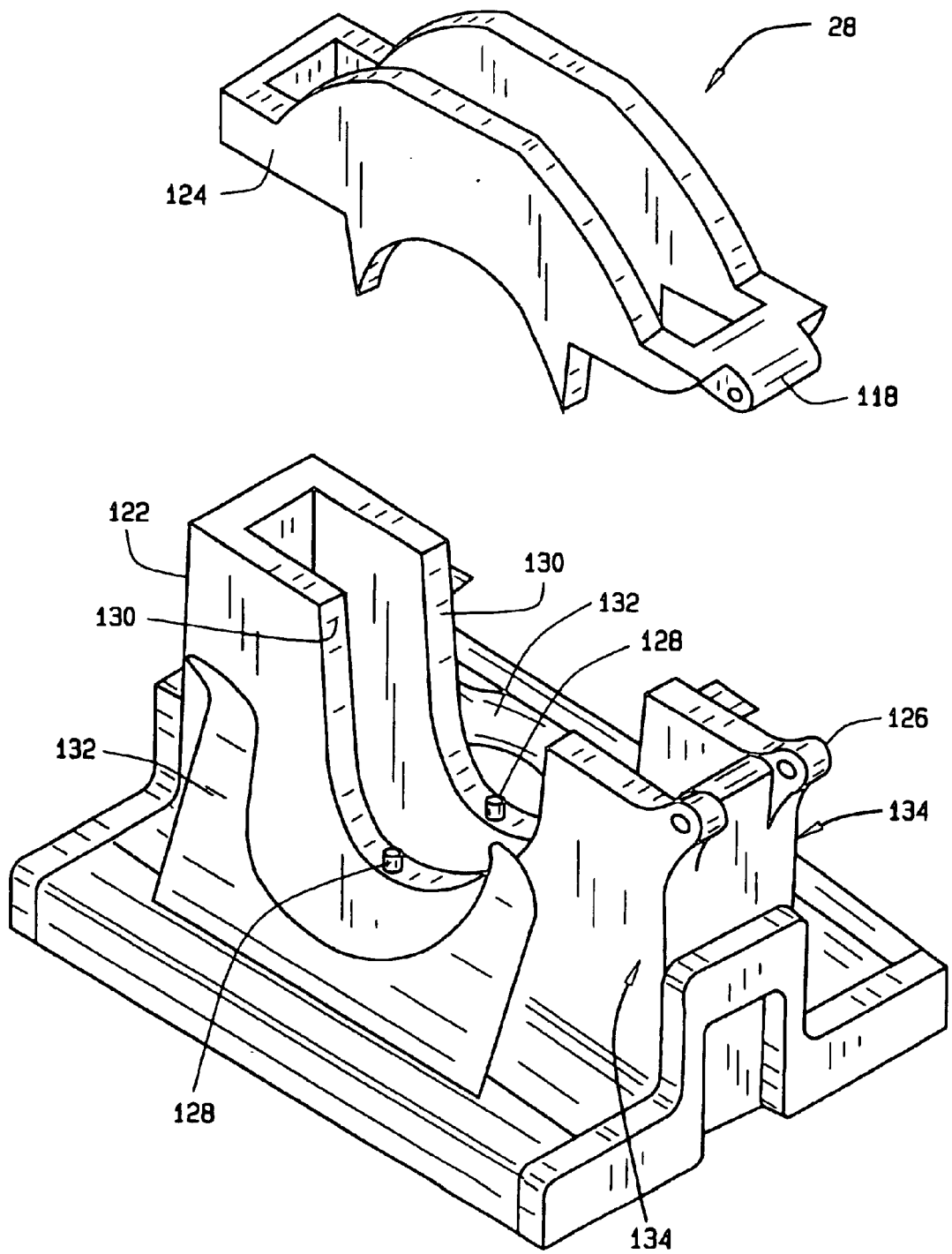
FIG. 5 is an isometric view of a welding cassette used in the system shown in FIG. 1.

FIG. 5 is an isometric view of welding cassette 28 (shown in FIG. 1). Welding cassette 28 includes a first half 122 and a second half 124 hingedly connected to first half 122 at hinge 126. Welding cassette 28 accurately positions and aligns mating pieces of tubing 34 such that the pieces of tubing 34 are held perpendicular to the direction of travel of a tungsten tip in an orbital welding head, and such that the weld joint is centered under the tungsten. Therefore, the mating pieces of tubing can be autogenously orbitally welded.

First half 122 includes a plurality of clocking pins 128 located on circumferential edges 130. Clocking pins 128 mate with clocking slots 94 (shown in FIG. 3) to rotationally orient each clamping block 16 such that the thin-walled tubing 34 clamped by each clamping block 16 is rotationally oriented in a desired position during orbital welding. As used herein, "rotationally oriented" means that clamping block 16 and tubing 34 are positioned within welding cassette 28 such that the circumference of tubing 34 is positioned about a longitudinal axis perpendicular to the direction of travel of an orbital welding head tungsten tip, thereby placing any bends in tubing 34 in a desired orientation. First half 122 also includes a plurality of retaining devices 132 for holding clamping blocks 16 in a desired position in welding cassette 28.

Figure 6:
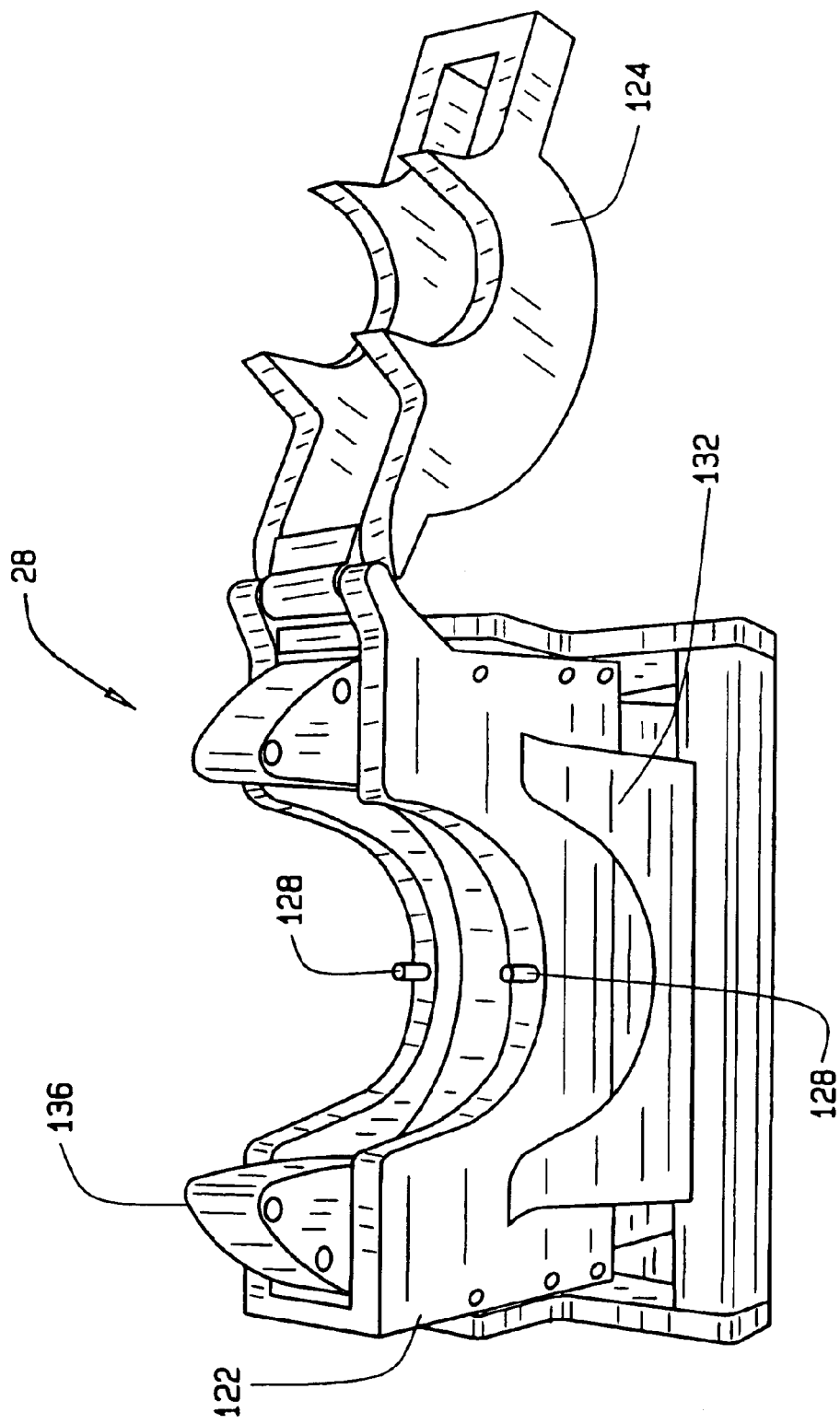
FIG. 6 is an isometric view of the welding cassette shown in FIG. 4 inserted over an orbital welding head.

Retaining devices 132 are located on each side of welding cassette 28. Each retaining device 132 allows a clamping block 16 to be inserted between retaining device 132 and one of two side walls 134 of welding cassette 28. Once the clamping block 16 is inserted, retaining device retains the clamping block 16 against a side wall 134, as shown in FIG. 6 described below. Although retaining device 132 is shown in FIG. 4 to be a flat spring, retaining device 132 could be any suitable device or means for holding clamping blocks 16 against side walls 134 while the tubing 34 clamped in the clamping devices 16 is orbitally welded. For example, retaining devices 132 could be bolts that extend through each clamping device 16 and thread into threaded holes in welding cassette 28. Alternatively, retaining devices 132 could each be a latch that opens to allow clamping blocks 16 to be put in place and closes to securely hold the clamping blocks 16 against welding cassette 28.

After each piece of tubing 34 is cut by the cutting machine, the distance from the face of the clamping block 16 to the cut end of the tubing 34 is one half the thickness of welding cassette 28. Therefore, when the mating pieces of tubing 34 are pushed together by retaining devices 132 there is a very tight fit-up of the pieces such that the pieces of tubing 34 can be autogenously welded.

FIG. 6 is an isometric view of welding cassette 28 (shown in FIG. 4) mounted over an orbital welding head 136. Welding cassette first half 122 is mounted over welding head 136 using any suitable securing method.

Figure 7:
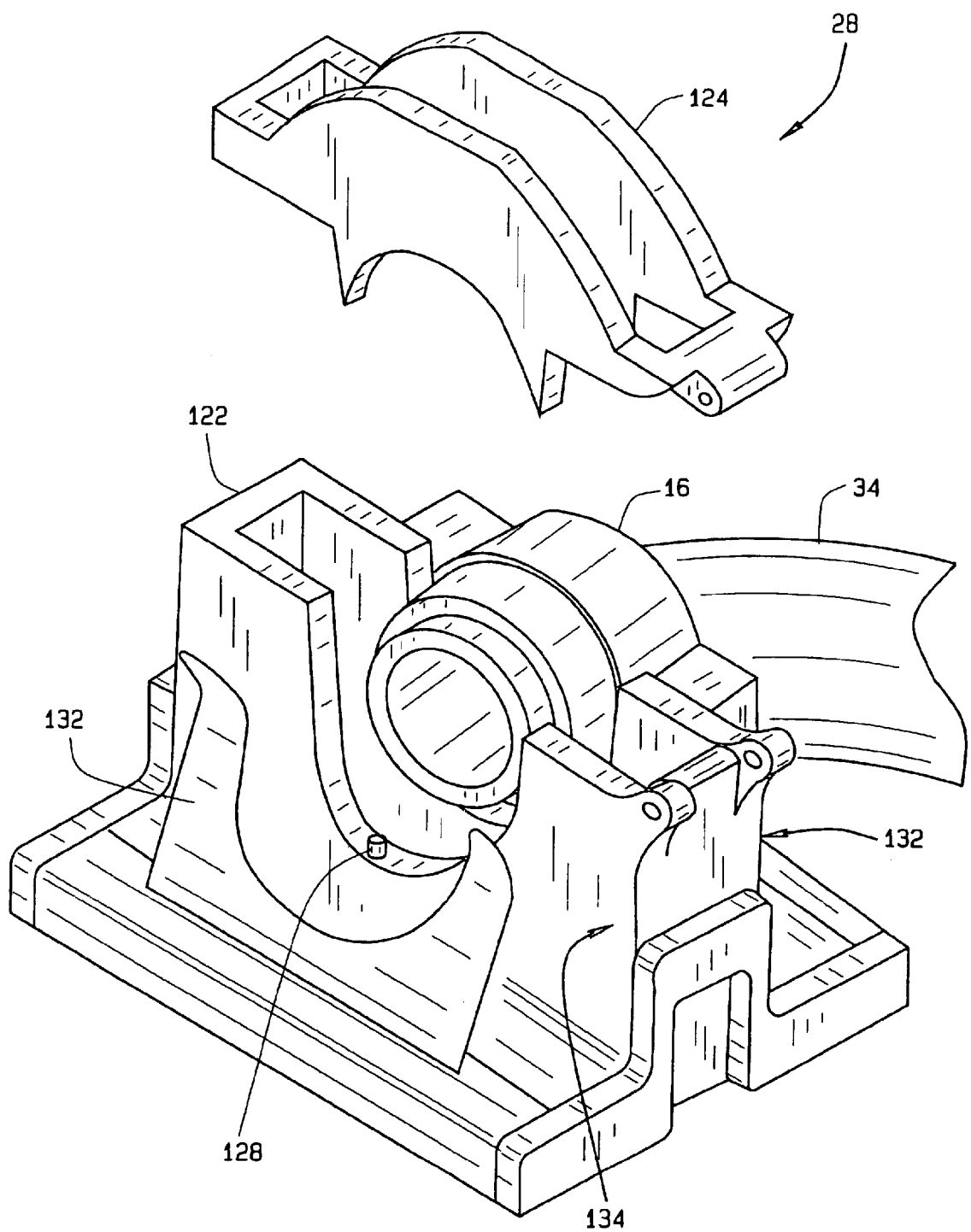
FIG. 7 is an isometric view of the welding cassette shown in FIG. 4 having the clamping block shown in FIG. 3 held in place by a retaining device.

FIG. 7 is an isometric view of welding cassette 28 having a clamping block 16 and respective tubing 34 held in place by a retaining device 132. Welding cassette second half 124 is placed in an open position such that a clamping block 16 can be inserted between retaining device 132 and welding cassette side walls 134. When each clamping block 16 and the respective tubing 34 is inserted into welding cassette 28, clocking slot 94 (shown in FIG. 3) is mated with clocking pin 128. By mating the clocking slot 94 of each clamping block 16 with a clocking pin 128, the pieces of tubing are properly rotationally orienting about a longitudinal axis perpendicular to the direction travel of a tungsten tip in welding head 136. Therefore, the resulting piece of welded tubing 34 will have a desired shape and configuration.

After a clamping block 16 and respective tubing 34 is inserted on each side of welding cassette first half 122 and the clocking slots 94 are mated with the clocking pins 128, welding cassette second half 124 is placed in a closed position, thereby securely enclosing welding head 136 and the two clamping blocks 16 within the welding cassette 28. In addition to securely holding the pieces of thin-walled tubing 34 during cutting, clamping blocks 16 maintain a desired circumferential shape, e.g. round, of the respective pieces of thin-walled tubing 34 such that tubing 34 can not flex during cutting or welding. Thus, once second half 124 is closed and clamping blocks 16 are secured in place, the pieces of tubing 34 held by clamping blocks 16 are precisely aligned and spaced having a tight fit-up such that orbital welding head 136 can autogenously weld the two pieces of thin-walled tubing 34 together.

Figure 8:
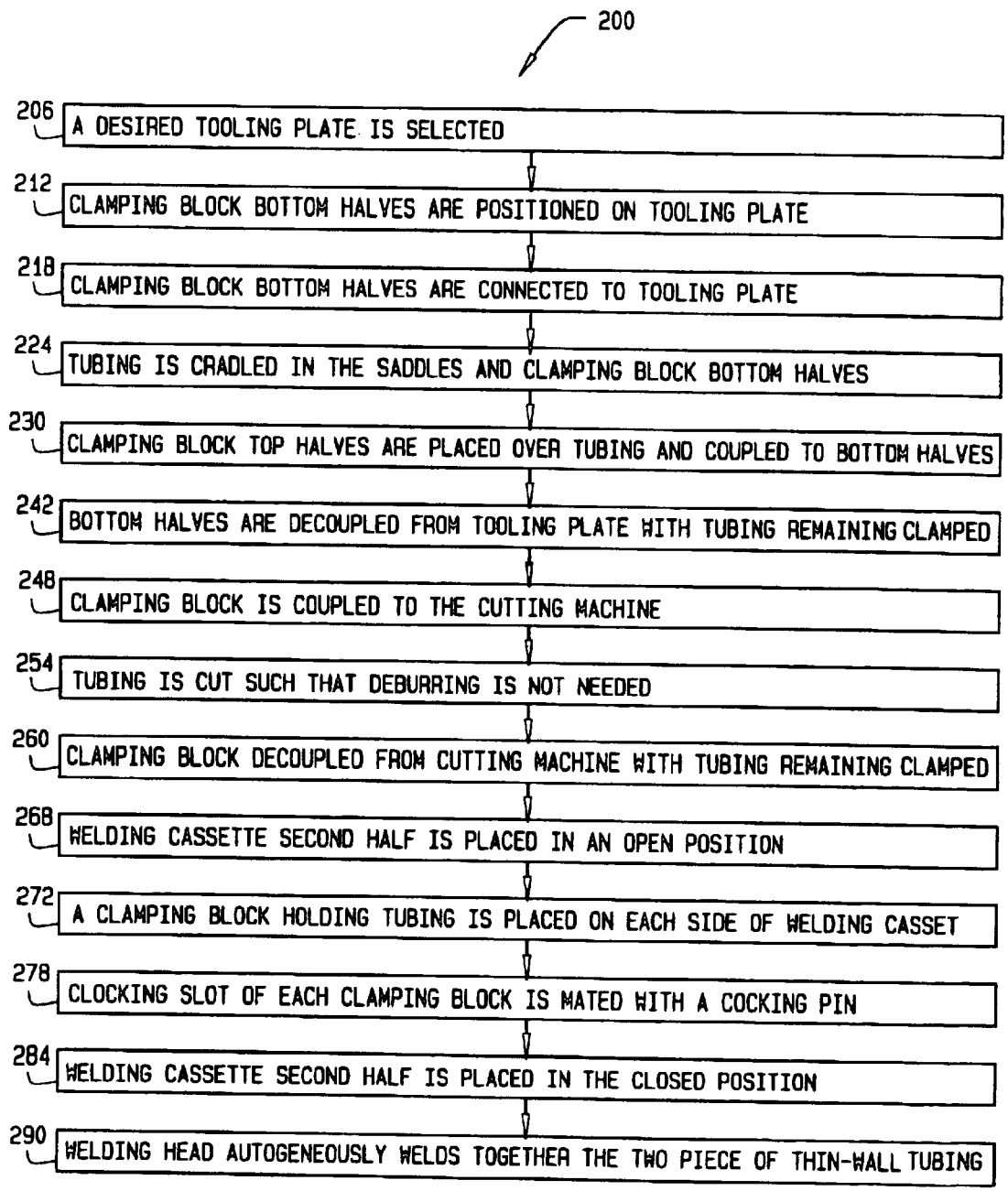
FIG. 8 is flow chart of a method for cutting and orbitally welding thin-walled tubing using the system shown in FIG. 1, in accordance with the preferred embodiment of the present invention.

FIG. 8 is a flow chart 200 for a method of cutting and orbitally welding thin-walled tubing using system 10 (shown in FIG. 1), in accordance with a preferred embodiment of the present invention. A desired tooling plate 22 is initially selected, at step 206. The desired tooling plate 22 is selected by choosing the tooling plate 22 having the tubing identification numbers 40 that correspond with the desired pieces of thin-walled tubing to be welded. After the proper tooling plate is selected, the appropriate number of saddles 34 and clamping block bottom halves 70, as designated by tubing outlines 46, are positioned, as indicated at step 212, using bullet nose pins 58 and bullet nose receivers 82, then connected to tooling plate 22, as indicated at step 218, utilizing connector receptors 64. Next the appropriate piece of tubing 34, as identified by tubing identification numbers 40, is cradled, as indicated at step 224, in the saddles 52 and clamping block bottom halves 70. Thereafter, clamping block top halves 76 are placed over the tubing 34 and coupled, as indicated at step 230, to bottom halves 70, thereby clamping tubing 34 within clamping blocks 16 and attaching tubing 34 to tooling plate 22.

Clamping block bottom halves 70 are then decoupled, at step 242, from tooling plate 22 with tubing 34 remaining clamped within clamping blocks 16. One at a time, each clamping block is coupled, as indicated at step 248, to the cutting machine and the respective piece of tubing 34 is cut, as indicated at step 254, such that deburring is not needed. After each piece of tubing 34 is cut, the clamping block 34 is decoupled, as indicated at step 260, from the cutting machine with the respective piece of tubing remaining clamped within clamping block 16. Once the pieces of tubing 34 have been cut by the cutting machine, welding cassette second half 124 is placed in an open position, as indicated at step 268.

Next, two clamping blocks 16, which respectively hold pieces of tubing 34 that are to be welded together, are placed between the retaining devices 132 and welding cassette first half side walls 134, as indicated at step 272. The clamping blocks 16 are placed in the welding cassette 28 adjacent each other such that one clamping block 16 is on each side of first half 122 and the respective pieces of tubing 34 extend away from first half 122 in opposing directions. As the clamping blocks 16 are placed between retaining devices 132 and welding cassette side walls 134, the clocking slot 94 of each clamping block 16 is mated with a clocking pin 128, as indicated at step 278, such that the respective pieces of tubing 34 are properly rotationally oriented about a longitudinal axis perpendicular to the direction of travel of the tungsten tip of orbital welding head 136.

After the clamping blocks 16 are properly inserted in welding cassette first half 122, welding cassette second half 124 is placed in the closed position, as indicated at step 284, thereby securing clamping blocks 16 within welding cassette 28. Once the clamping blocks 16 are secured within welding cassette 28, the mating pieces of thin-walled tubing 34 are properly positioned such that the pieces of tubing 34 are held perpendicular to the axis of tungsten travel and the tungsten tip is aligned over the weld joint. Finally, orbital welding head 136 autogenously welds together the two piece of thin-wall tubing 34, as indicated at step 290, held by the respective clamping blocks 16 on either side of the welding cassette 28.

While the invention has been described in terms of various specific embodiments, those skilled in the art will recognize that the invention can be practiced with modification within the spirit and scope of the claims.

What is claimed is:

1. A system for orbitally welding thin-walled tubing, said system comprising:
   a plurality of clamping blocks fixedly clamped onto said tubing and configured to continuously hold said tubing while said tubing is trimmed using a first device and then moved from said first device to a second where said tubing is orbitally welded;
   at least one tooling plate configured to have said clamping blocks mounted thereto such that said tubing is attached to said tooling plate and aligned to be net length trimmed; and
   a welding cassette configured to retain said clamping blocks and align said tubing during orbital welding.

2. The system of claim 1 wherein said tooling plate comprises:
   at least one tubing identification number for identifying a specific piece of tubing to be attached to said tooling plate; and
   at least one tubing outline configured to indicate a position of said identified tubing on said tooling plate and locate said tubing for net length trimming.

3. The system of claim 1 wherein said tooling plate comprises:
   a plurality of bullet nose pins configured to position said clamping blocks on said tooling plate; and
   a plurality of connector receptors configured to mount said clamping blocks on said tooling plate.

4. The system of claim 1 wherein said clamping blocks each comprise:
   a bottom half comprising a plurality of bullet nose receivers configured to position said bottom half on said tooling plate, said bottom half coupled to said mounting plate using a plurality of connectors; and
   a top half configured to be coupled to said bottom half after said tubing is cradled in said bottom half, thereby clamping said tubing between said bottom half and said top half.

5. The system of claim 4 wherein at least one of each said bottom half and each said top half further comprises a clocking slot configured to rotationally orient said tubing in a desired position during orbital welding.

6. The system of claim 1 wherein said welding cassette comprises:
   a first half configured to receive an orbital welding head and a pair of clamping blocks, each said clamping block holding a respective piece of tubing; and
   a second half hingedly connected to said first half such that said second half can be placed in an open position to allow said first half to receive said clamping blocks, and further placed in a closed position thereby enclosing the welding head and retaining said clamping blocks in a fixed position within said welding cassette.

7. The system of claim 6 wherein said first half comprises:
   a plurality of clocking pins configured to rotationally orient said tubing in a desired position for orbital welding; and
   a plurality of retaining devices configured to hold said pair of clamping blocks in said welding cassette, thereby positioning and aligning said respective pieces of tubing adjacent each other during orbital welding.

8. The system of claim 1 wherein said clamping blocks are further configured to retain said tubing in a desired circumferential shape while being trimmed and orbitally welded.

9. The system of claim 1 further comprising a cutting machine configured to:
   utilize said clamping blocks to hold said tubing in a desired position during cutting; and
   cut said tubing such that deburring is not needed.

10. A method for cutting and orbitally welding thin-walled tubing using a system including a plurality of clamping blocks, at least one tooling plate and a welding cassette, said method comprises:
   clamping the tubing in the clamping blocks after a bottom half of each clamping block has been coupled to the tooling plate;
   removing the clamping blocks from the tooling plate while the tubing remains clamped in the clamping blocks;
   mounting one of the cutting blocks in a cutting machine and cutting the tubing to a desired length while the tubing remains clamped in the clamping blocks;
   removing the one cutting block from the cutting machine while the tubing remains clamped in the clamping blocks; and
   orbitally welding mating pieces of the tubing while the tubing remains clamped in the clamping blocks.

11. The method of claim 10 wherein the clamping blocks include a top half and the bottom half, each bottom half having a plurality of bullet nose receivers, the tooling plate includes a plurality of bullet nose pins and connector receptors, and wherein clamping the tubing in the clamping blocks comprises:
   positioning the bottom half of each of the clamping blocks on the tooling plate utilizing the bullet nose pins and the bullet nose receivers;
   coupling the bottom half of each of the clamping blocks to the tooling plate utilizing a plurality of connectors and the connector receptors;
   cradling a piece of tubing in each bottom half; and
   coupling the top halves to the bottom halves, thereby clamping the piece of tubing between the bottom halves and the top halves.

12. The method of claim 10 wherein cutting the tubing to a desired length comprises:
   utilizing the cutting machine to cut the tubing adjacent the clamping block such that deburring is not needed.

13. The method of claim 10 wherein the welding cassette includes a first half and a second half hingedly connected to the first half such that the second half is pivotal between an open position and a closed position, and wherein orbitally welding comprises placing the second half in the open position.

14. The method of claim 13 wherein at least one of the bottom half and the top half of each clamping block further includes a clocking slot and the first half of the welding cassette includes a plurality of clocking pins, a pair of sidewalls, and a plurality of retaining devices, and wherein orbitally welding further comprises:
   placing a pair of clamping blocks adjacent each other between the retaining devices and the side walls such that the tubing clamped in each respective clamping block is held perpendicular to an axis of travel of an orbital welding head tungsten tip, and such that a joint to be welded is centered under the tungsten tip; and
   mating the clocking slot of each of the clamping blocks with a clocking pin, thereby rotationally orienting each clamping block about the axis of travel the tungsten tip.

15. The method of claim 14 wherein orbitally welding further comprises:
   placing the second half in the closed position such that the pair of clamping blocks are enclosed adjacent each other in the welding cassette; and
   welding the pieces of tubing together in the desired position, and alignment utilizing the orbital welding head.

16. The method of claim 10 wherein the method further comprises retaining the tubing in a desired circumferential shape while being trimmed and orbitally welded utilizing the clamping blocks.

17. A system for cutting and orbitally welding thin-walled tubing, said system comprising:
   at least one tooling plate comprising a plurality of bullet nose pins and connector receptors, said tooling plate configured to align said tubing for net length trimming;
   a plurality of clamping blocks each comprising a bottom half and a top half, each said bottom half having a plurality of bullet nose receivers that mate with said bullet nose pins to position said bottom halves on said tooling plate, each said bottom half coupled to said mounting plate using a plurality of connectors interlocked with said connector receptors, and said top halves configured to be coupled to said bottom halves after said tubing is cradled in said bottom halves, thereby clamping said tubing between said bottom halves and said top halves and aligning said tubing to be net length trimmed, said clamping block configured to be removed from said tooling plate while remaining clamped on said tubing and to continue to hold said tubing while said tubing is trimmed, and orbitally welded; and
   a welding cassette comprising a first half and a second half, said first half configured to receive an orbital welding head and comprising a plurality of retaining devices configured to hold a pair of said clamping blocks between said retaining devices and a pair of sidewalls of said first half, said second half hingedly connected to said first half such that said second half can be placed in an open position to allow said pair of clamping blocks to be inserted between said retaining devices and said sidewalls, and further placed in a closed position to retain said pair of clamping blocks within said welding cassette such that said tubing clamped in said clamping blocks is aligned perpendicular to a direction of travel a tungsten tip of said orbital welding head, and such that a weld joint between said tubing is centered under said tungsten tip.

18. The system of claim 17 wherein at least one of each said bottom half and each said top half of said clamping block further comprises a clocking slot, and said first half of said welding cassette comprises a plurality of clocking pins such that engagement of said clocking slot of each said clamping block with one of said clocking pins rotationally orients said respective pieces of tubing in a desired position during orbital welding.

19. The system of claim 17 wherein said clamping blocks are further configured to retain said tubing in a desired circumferential shape while being net length trimmed, and orbitally welded.

20. The system of claim 17 further comprising a cutting machine configured to utilize said clamping blocks to hold said tubing in a desired position during cutting and to cut said tubing such that deburring is not needed.

21. A system for orbitally welding thin-walled tubing, said system comprising:

a plurality of clamping blocks configured to fixedly clamp onto and continuously hold a pair of lengths of tubing, each of said clamping blocks including a first positioning system;

a welding cassette having a pair of second positioning systems for cooperating with said first positioning systems to precisely align said lengths of tubing relative to each other, and to an orbital welding head disposed adjacent said welding cassette, when said lengths of tubing are positioned in said welding cassette, thereby enabling said lengths of tubing to be orbitally welded to one another; and wherein said first positioning system comprises a clocking slot, and said pair of second positioning systems comprises a pair of clocking pins.

* * * * *